F. BURY.
TROLLEY.
APPLICATION FILED MAR. 14, 1912.
1,037,123.
Patented Aug. 27, 1912.
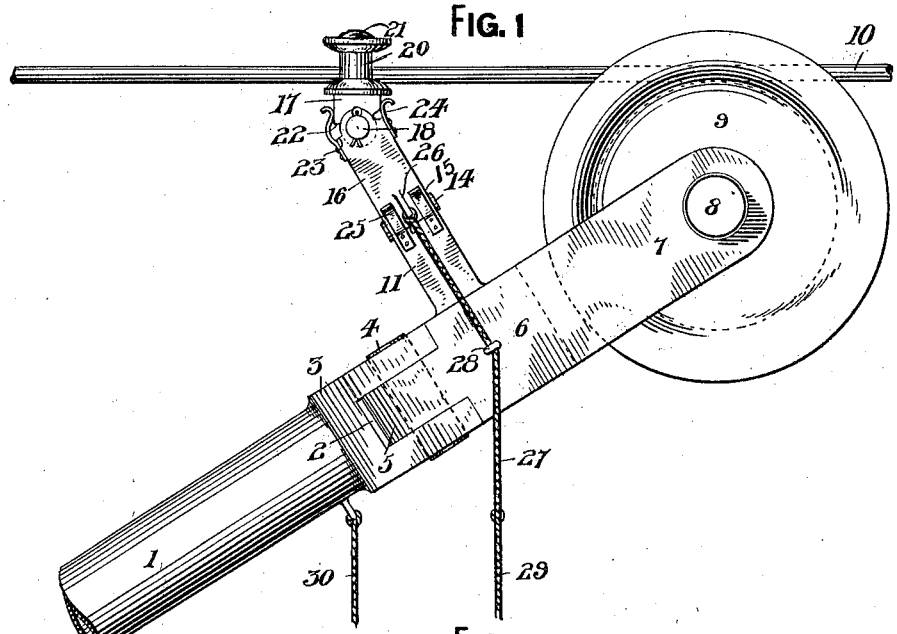
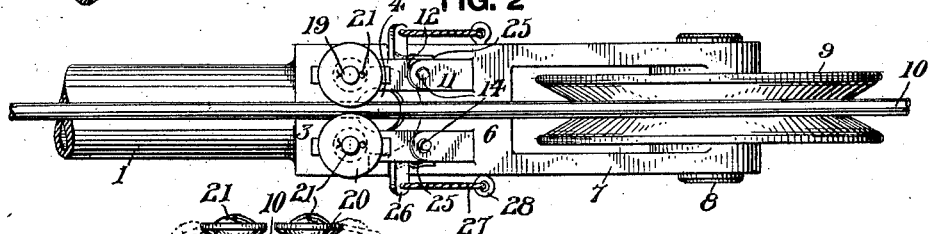
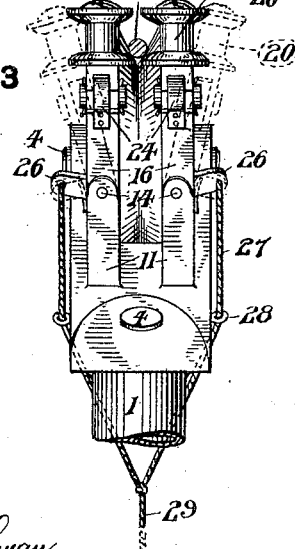
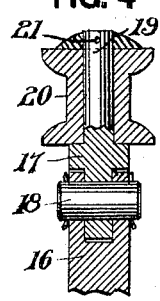
WITNESSES:
J. P. Appleman,
C. J. Hood.
INVENTOR.
F. Bury
BY
ATTORNEYS

UNITED STATES PATENT OFFICE.

FRANK BURY, OF LYNDORA, PENNSYLVANIA, ASSIGNOR OF ONE-HALF TO JOSEPH A. KALINA, OF LYNDORA, PENNSYLVANIA.

TROLLEY.

1,037,123.   Specification of Letters Patent.   Patented Aug. 27, 1912.

Application filed March 14, 1912. Serial No. 683,909.

*To all whom it may concern:*

Be it known that I, FRANK BURY, a subject of the Emperor of Austria-Hungary, residing at Lyndora, in the county of Butler and State of Pennsylvania, have invented certain new and useful Improvements in Trolleys, of which the following is a specification, reference being had therein to the accompanying drawing.

This invention relates to trolleys, and the objects of my invention are to furnish a trolley harp with positive and reliable means, as will hereinafter appear, for retaining the trolley wheel of the harp upon the trolley wire, or electric conductor, and to provide a trolley harp that can be used in connection with various types of trolley poles, especially the poles of high speed, suburban electric trolley railways.

Further objects of my invention are to provide a trolley attachment that will prevent the accidental displacement of the trolley wheel when passing around a short curve, descending a grade, or encountering wire irregularities, or the over-head construction of a trolley system, and to accomplish the above results by a mechanical construction that is simple, durable and highly efficient for the purposes for which it is intended.

With the above and other objects in view, the invention resides in the novel construction, combination and arrangement of parts, to be hereinafter specifically described and then claimed.

Reference will now be had to the drawing, wherein there is illustrated a preferred embodiment of the invention, but it is to be understood that the structural elements are susceptible to such variations and modifications as fall within the scope of the appended claims.

In the drawing:—Figure 1 is a side elevation of the trolley in accordance with this invention. Fig. 2 is a plan of the same. Fig. 3 is an end view of the trolley, and Fig. 4 is an enlarged vertical sectional view of one of the rollers or spools of the trolley.

The reference numeral 1 denotes a portion of the trolley pole, having the upper end thereof enlarged and bifurcated to provide a slot and oppositively disposed apertured arms 3, and in these arms there is mounted a transverse pivot pin 4. Pivotally mounted upon this pin is the apertured tongue 5, of a harp 6, said harp having apertured arms 7 for the journaled pin 8 of a trolley wheel 9, adapted to travel upon a wire 10, or other electric conductor.

With the harp pivotally connected to the upper end of the pole, the trolley wheel 9 can easily adjust itself to the wire, particularly upon a curved section of said wire, thereby compensating for any inequality between the track beneath the trolley wire and the correct position of said wire relatively to the track.

The harp 6, adjacent to the lower pivoted end thereof, is provided with a set of bearings 11, having the upper ends thereof bifurcated or slotted as at 12, to provide lugs, which are apertured to receive pivot pins 14. Pivotally mounted upon the pins 14 are the lower end 15 of arms 16. The upper ends of the arms are constructed similar to the upper ends of the bearings 11, whereby roller or spool holders 17, can be pivotally connected to the upper ends of the arms 16 by pins 18. The pivotal connections of the holders 17 are at right angles to the pivotal connections between the arms 16 and the bearings 11, whereby the holders will have a movement longitudinally of the trolley, and the arms 16 and outward or transverse movement with respect to the trolley. The holders 17 are provided with stems 19 and revolubly mounted upon the stems are rollers or spools 20, retained upon the stems by cotter pins 21. The holders 17 are limited in their movement by the shoulders 22 of said holders, engaging the shoulders 23 of the arms 16, and said holders are normally retained in a vertical position by flat springs 24, secured to the sides of the arms 16, and engaging the sides of the holders 17.

The arms 16 are normally retained in a vertical position by flat springs 25, secured to the outer sides of the bearings 11, and engaging the outer sides of the arms 16. In order that the arms 16 can be sprung outwardly, the lower pivoted ends of the arms have outwardly projecting apertured lugs 26, to which are connected the upper ends of branch cables 27, said cables passing through eyelets or staples 28, carried by the harps 6, and connecting with the main cable 29, that extends downwardly to the car, whereby the conductor or operator of the car can easily pull upon the cable to open the arms 16, and remove the rollers or spools 20 from their juxtaposition to the trolley wire 10.

To facilitate the lowering of the trolley pole, said pole has an additional cable 30 attached to the pole, contiguous to the upper end thereof.

In the operation of the trolley, the rollers or spools prevent accidental displacement of the trolley wheel 9, relatively to the wire 10, but these rollers or spools recede when any obstruction is encountered, as a wire hanger or rail.

What I claim is:—

1. The combination with a trolley pole, a harp pivotally connected to said pole, and a wheel journaled in said harp, and adapted to travel upon the trolley wire, of bearings carried by said harp, arms pivotally mounted in the upper ends of said bearings, holders pivotally connected to the upper ends of said arms, spools revolubly supported by said holders in proximity to the wire, upon which said wheel travels, lugs carried by said arms, branch cables connected to said lugs, whereby said arms can be swung outwardly, and means carried by said bearings adapted to normally maintain said arms in alinement with said bearings.

2. In a trolley, a pole, a harp pivotally connected to said pole, bearings carried by said harp, arms pivotally connected to said bearings, holders pivotally connected to said arms on pivots at right angles to the pivotal connections of said arms, spools revolubly supported by said holders, springs carried by said bearings and adapted to retain said arms in alinement therewith, springs carried by said arms and adapted to retain said holders in a vertical position, and means attached to said arms and adapted to facilitate the opening of said arms to separate such spools.

In testimony whereof I affix my signature in the presence of two witnesses.

FRANK BURY.

Witnesses:
 John W. Coulter,
 William G. Wilson.

---

Copies of this patent may be obtained for five cents each, by addressing the "Commissioner of Patents, Washington, D. C."